United States Patent [19]
Christensen et al.

[11] Patent Number: 5,996,078
[45] Date of Patent: Nov. 30, 1999

[54] METHOD AND APPARATUS FOR PREVENTING INADVERTENT POWER MANAGEMENT TIME-OUTS

[75] Inventors: Alan Christensen; Fritz Kocher, both of Austin, Tex.

[73] Assignee: Dell USA, L.P., Round Rock, Tex.

[21] Appl. No.: 08/785,373

[22] Filed: Jan. 17, 1997

[51] Int. Cl.$^6$ .................................................. G06F 1/00
[52] U.S. Cl. ...................... 713/300; 713/320; 713/323; 713/324; 713/330; 713/502; 713/601; 713/310
[58] Field of Search .................................. 395/750, 750.5, 395/750.8, 750.01; 713/300, 323, 340, 310, 320, 330, 502, 601

[56] References Cited

U.S. PATENT DOCUMENTS

| | | | |
|---|---|---|---|
| 5,056,057 | 10/1991 | Johnson et al. | 364/900 |
| 5,404,546 | 4/1995 | Stewart | 713/322 |
| 5,560,024 | 9/1996 | Harper et al. | 395/750 |
| 5,586,333 | 12/1996 | Choi et al. | 395/750 |
| 5,652,890 | 7/1997 | Foster et al. | 395/750 |
| 5,666,540 | 9/1997 | Hagiwara et al. | 395/750.05 |
| 5,675,282 | 10/1997 | Saito | 327/544 |
| 5,710,931 | 1/1998 | Nakamura et al. | 395/750 |
| 5,732,212 | 3/1998 | Perholtz et al. | 395/200.11 |
| 5,754,798 | 5/1998 | Uehara et al. | 710/104 |
| 5,765,004 | 6/1998 | Foster et al. | 713/323 |
| 5,768,604 | 6/1998 | Yamazaki et al. | 713/323 |
| 5,799,198 | 8/1998 | Fung | 713/323 |
| 5,805,923 | 9/1998 | Shay | 710/8 |
| 5,832,281 | 11/1998 | Maeda | 713/300 |
| 5,850,559 | 12/1998 | Angelo et al. | 713/320 |

OTHER PUBLICATIONS

Messmer, Hans–Peter; *The Indispensable PC Hardware Book*, Your Hardware Questions Answered; Addison–Wesley Publishing Company, Inc.; Essex, England; Second Edition; 1995; pp. 1051 and 1142–1144.

Kelsey, Jim; "Understand power management to optimize performance and power savings"; Personal Engineering; Expert Column; Dec. 1994; pp. 56–59.

"Advanced Configuration and Power Interface Specification"; Intel, Microsoft, and Toshiba Corporations; Dec. 22, 1996; pp. ii through xiii and 1–1 through 16–261.

*Primary Examiner*—Ayaz R. Sheikh
*Assistant Examiner*—Frantz B. Jean
*Attorney, Agent, or Firm*—Skjerven, Morrill, MacPherson, Franklin & Friel, L.L.P.; William W. Holloway

[57] ABSTRACT

An inadvertent invocation of power management is avoided by having an application program set a storage location to a predetermined value. The application program then calls a BIOS software interrupt from the application program. The BIOS software interrupt routine determines if the storage location contains the predetermined value and if so, resets the power management timers, thus preventing power management from being inadvertently invoked.

12 Claims, 2 Drawing Sheets

METHOD AND APPARATUS FOR PREVENTING INADVERTENT POWER MANAGEMENT TIME-OUTS

BACKGROUND OF THE INVENTION

1. Field of the Invention

This invention relates to power management in computers.

2. Description of the Related Art

Computers with power-management capabilities are known. Power management causes the computer to turn off a large portion of its circuitry in order to conserve power. Such power management techniques are common on portables and on "green" computers. For instance, such computers utilize a power management timer that will cause the computer to go into a power management mode when the timer has timed out. However, the timer is reset by such activity as keyboard or mouse activity. Thus, when the keyboard or mouse is active, the computer will not go into a power management mode.

When computers with power management are used with applications such as serial communication programs, the power management feature can be invoked inadvertently, during, e.g., a long download, when there is no keyboard or mouse activity. That can disrupt the serial protocol and cause an error or an abort of the download or other serial communication.

One solution to the problem of inadvertent invocation of power management is to turn off power management through the setup screen prior to starting the serial communications program. The user must then remember to turn power management back on after the serial communications program has completed its task. In many cases that requires a reboot of the computer system.

It would be desirable to provide a power management system in which application programs will not be disrupted on account of inadvertent invocation of power management mode. Further, it would be desirable to provide such a power management system which requires no user intervention.

SUMMARY OF THE INVENTION

Accordingly, the invention provides a method and apparatus for preventing inadvertent invocation of power management. The method provides that an application program sets a predetermined storage location to a predetermined value. The application program then calls a BIOS software interrupt from the application program. The BIOS software interrupt routine determines if the predetermined storage location contains the predetermined value and if so, resets the power management timers. That prevents the power management from being inadvertently invoked. Further, no user intervention is required since the application program resets the power management timers through the BIOS software interrupt automatically.

BRIEF DESCRIPTION OF THE DRAWINGS

The present invention may be better understood, and its numerous objects, features, and advantages made apparent to those skilled in the art by referencing the accompanying drawing.

DESCRIPTION OF THE PREFERRED EMBODIMENT(S)

In a PC environment, in order to provide a power management system that does not require user intervention during application programs in which keyboard or mouse entry will not occur, a new interrupt routine is provided in the Basic Input/Output System (BIOS). The BIOS comprises the system programs for input and output operations and provides the software interface to the system hardware. Typical BIOS functions include access to disk drives, serial and parallel interfaces and graphics. Other BIOS functions include power management capabilities.

In one exemplary power management system, the BIOS will maintain a timer or timers in memory or utilize an available timer. The timers will count up (or down) and when they reach a predetermined value, e.g. 5 minutes, they will cause the power to be shut down to predetermined areas of the computer system. However, keyboard or mouse activity causes the BIOS to reset the timers so the count restarts from the beginning.

An application program, e.g., a serial communication program may not know where the timers are in the BIOS. However, the invention provides a predefined software interrupt and subfunction that will allow the application program to ensure that the timer(s) do not time-out inadvertently by periodically resetting them during operation of the program. Thus, for instance, during a serial download operation, the communication software will periodically invoke the software interrupt.

In one exemplary embodiment the software interrupt is 14h, which is a BIOS software interrupt defined to support serial interfaces. BIOS interrupt 14h may be particularly appropriate because many application programs that would utilize the new BIOS interrupt are serial communication programs. However, other software interrupts could function just as well.

In an exemplary embodiment, a function 06h (AX=6) of interrupt 14h may be defined to perform the resetting of the timer(s). The software interrupt routine will check to see if the predefined register location AX has a particular value in it. The particular value is 6 in the example provided. If so, the software interrupt will reset the timer or timers as if keyboard or mouse activity has taken place. The application program must therefore ensure that a value of 6 is loaded into the AX register before calling the software interrupt. Other values may also be used. For instance, one could choose AX=4. Other registers besides AX could of course also be used. It may be preferable to use a function that has not been defined for other purposes.

Figure 1A:
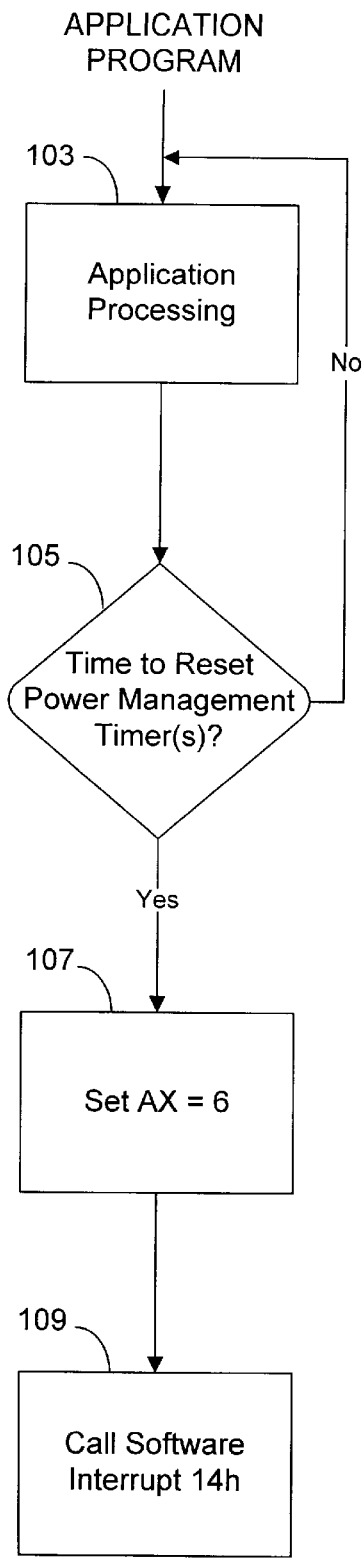
FIG. 1a shows a flowchart of application software utilizing the present invention.
Figure 1B:
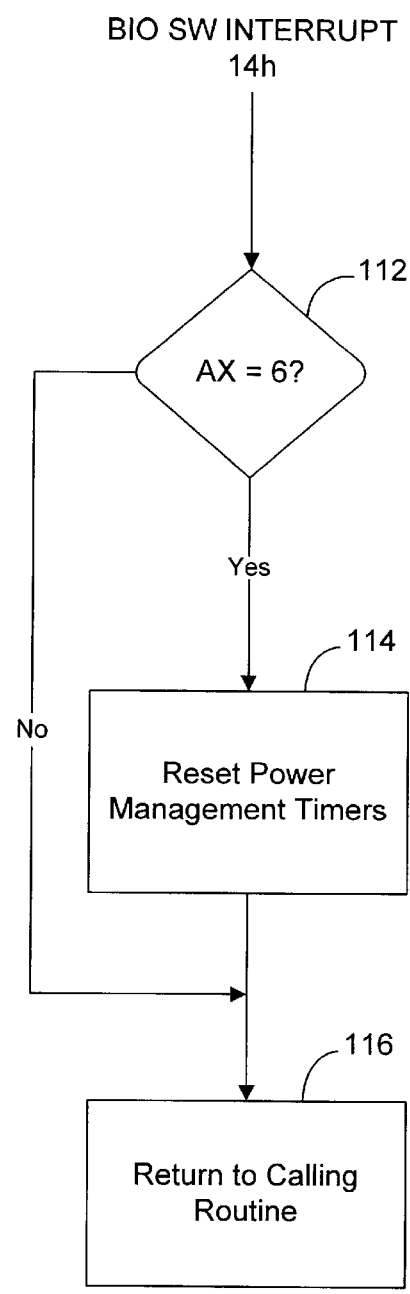
FIG. 1b shows a flowchart of a BIOS interrupt routine.

A flowchart of the application program is shown in FIG. 1a. An application program enters into application processing in step 103. Periodically during application processing in step 105, the application program determines, through a timer, counter or other appropriate mechanism, if it is time to reset the power management timers. If so, the application program will set the AX register to 6 in step 107 and call software interrupt 14h in step 109.

BIOS software interrupt routine 14h checks in step 112, among other standard functions defined for 14h, whether the AX register equals 6. If so, then the power management timers are reset in step 114, as if keyboard or mouse activity had taken place. The BIOS then returns to the calling routine in step 116. The calling routine, which is the application software, then continues application processing, periodically invoking BIOS interrupt 14h to ensure that no inadvertent time outs occur.

Figure 2:
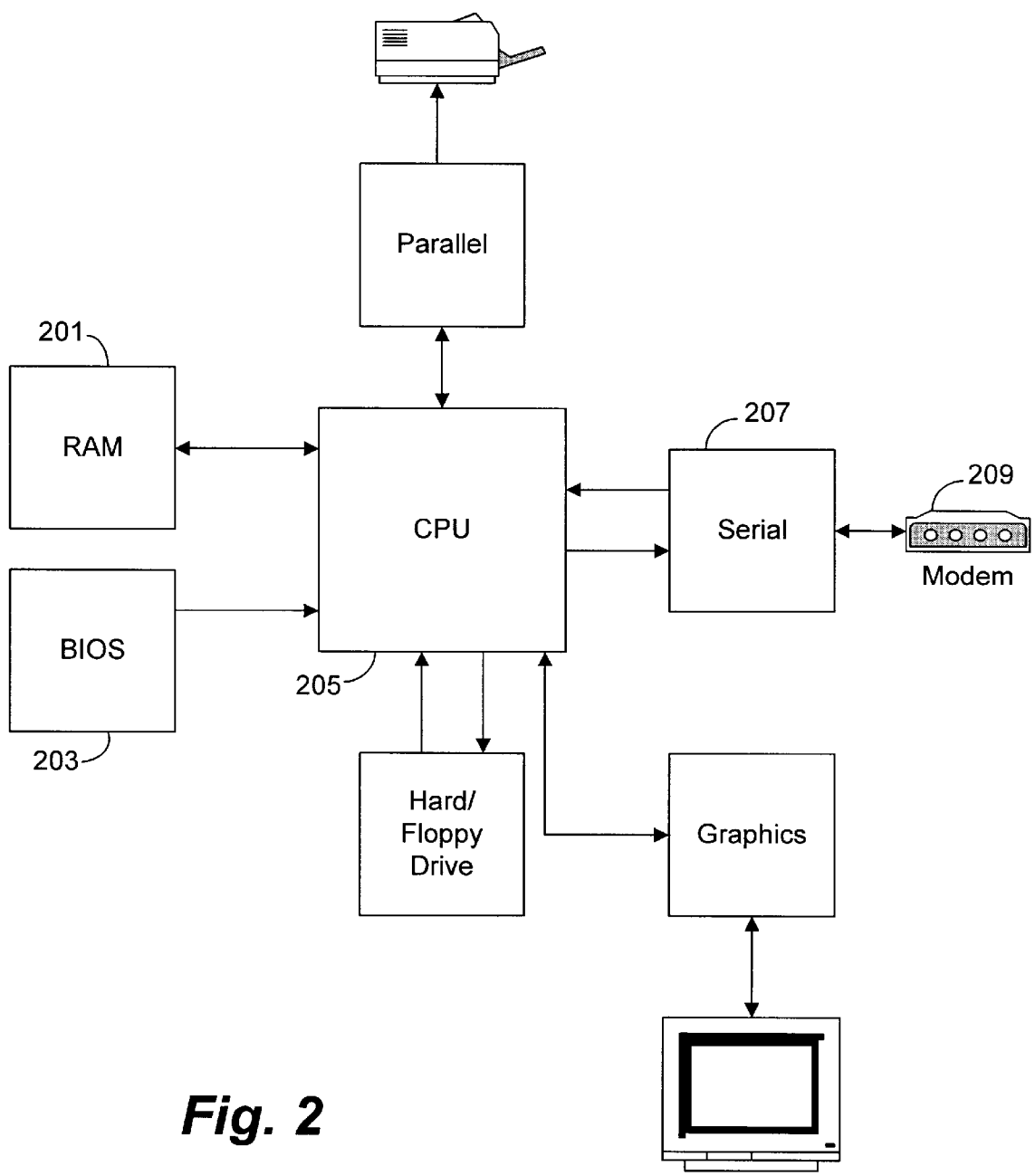
FIG. 2 shows a block diagram of a computer system implementing the invention.

FIG. 2 shows a high level block diagram illustrating one embodiment of a typical computer system utilizing the invention. The application program may reside in RAM 201 while the BIOS resides in memory 203 which may be, e.g., flash memory or ROM. CPU 205 communicates over serial interface 207 to modem 209. The communications program would utilize software interrupts in BIOS to prevent unwanted power management invocations during a long upload or download via the modem.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of preventing inadvertent invocation of power-management, the method comprising:

in an application program, setting a predetermined storage location to a predetermined value prior to calling the BIOS software interrupt routine from the application program;

in an application program, periodically calling a BIOS software interrupt routine; and in the BIOS software interrupt routine, determining if the storage location contains the predetermined value; and in the BIOS software interrupt routine, responsive to being called by the application program, resetting at least one power management timer if the predetermined storage location contains the predetermined value, thereby preventing inadvertent invocation of power management.

2. The method as recited in claim 1 wherein the BIOS software interrupt is interrupt 14h.

3. The method as recited in claim 1 wherein the storage location is a processor register.

4. The method of claim 1, wherein the application program is configured to perform a first function, the application program periodically calling the BIOS software interrupt routine during the performing of the first function if a time for completion of the first function is longer than a time-out time of the at least one power management timer.

5. The method of claim 4, wherein the first function is a serial communication function, the application program calling the BIOS software interrupt routine to prevent inadvertent invocation of power management while the serial communication function is performed.

6. A computer system comprising:

at least one power management timer;

means for resetting the power management timer;

a storage location;

means for storing a predetermined value in the storage location;

means for determining when the predetermined location is stored in the storage location;

a BIOS operating on the computer system, the BIOS having a software interrupt; and an application program operating on the computer system, the application program including, a first code sequence activating the means for storing the predetermined value in the storage location, and a second code sequence periodically calling the software interrupt after storing the predetermined value in the storage location;

wherein the software interrupt activates the means for determining when a predetermined value is stored in a storage location;

when the means for determining determines that the predetermined is stored in the storage location, the software interrupt activates the means for resetting the one power management timer.

7. The computer system as recited in claim 6 wherein the software interrupt is interrupt 14h.

8. The computer system as recited in claim 6 wherein the storage location is a processor register.

9. The computer system of claim 6, wherein the application program is a serial communications application.

10. In a computer system in which a predetermined value is stored periodically in a storage location in response to an application program; the computer system including apparatus determining when the predetermined value is stored in the storage location and including apparatus resetting at least one power management timer, a computer program on a computer readable medium, the computer program comprising:

a BIOS having a software interrupt responsive to the application program, the software interrupt having an interrupt handling routine including, a first subroutine periodically activating the apparatus determining when the predetermined value is stored in the storage location;

a second subroutine responsive to a determination of the presence of the predetermined value in the storage location, the second subroutine activating the apparatus resetting the one power management timer.

11. The computer program as recited in claim 10 wherein the software interrupt is interrupt 14h.

12. The computer program as recited in claim 11 wherein the storage location is a processor register.

* * * * *